United States Patent
Lau et al.

(10) Patent No.: US 11,520,152 B1
(45) Date of Patent: Dec. 6, 2022

(54) HEAD-MOUNTED DISPLAY SYSTEMS WITH GAZE TRACKER ALIGNMENT MONITORING

(71) Applicant: Apple Inc., Cupertino, CA (US)

(72) Inventors: Brian S. Lau, Sacramento, CA (US); David A. Kalinowski, Davis, CA (US); Michael J. Oudenhoven, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/365,815

(22) Filed: Jul. 1, 2021

Related U.S. Application Data

(60) Provisional application No. 63/062,347, filed on Aug. 6, 2020.

(51) Int. Cl.
*G02B 27/01* (2006.01)
*G02B 6/10* (2006.01)
*H04N 13/383* (2018.01)

(52) U.S. Cl.
CPC ......... *G02B 27/0172* (2013.01); *G02B 6/102* (2013.01); *H04N 13/383* (2018.05); *G02B 2027/0123* (2013.01); *G02B 2027/0178* (2013.01)

(58) Field of Classification Search
CPC ................ G02B 27/0172; G02B 6/102; G02B 2027/0123; G02B 2027/0178; H04N 13/383

See application file for complete search history.

(56) References Cited

U.S. PATENT DOCUMENTS

| | | | |
|---|---|---|---|
| 9,097,891 B2 | 8/2015 | Border et al. | |
| 9,134,534 B2 | 9/2015 | Border et al. | |
| 9,182,596 B2 | 11/2015 | Border et al. | |
| 9,223,134 B2 | 12/2015 | Miller et al. | |
| 10,168,531 B1 * | 1/2019 | Trail | G02B 27/0093 |
| 10,539,787 B2 | 1/2020 | Haddick et al. | |
| 10,698,204 B1 * | 6/2020 | Ouderkirk | G02B 27/0172 |
| 10,698,483 B1 * | 6/2020 | Ouderkirk | G02B 27/0176 |
| 10,980,415 B1 * | 4/2021 | Ouderkirk | A61B 3/113 |
| 11,269,406 B1 * | 3/2022 | Sztuk | G06F 3/011 |
| 11,307,654 B1 * | 4/2022 | Zhang | G06V 10/94 |
| 11,320,650 B1 * | 5/2022 | Tiana | G02B 27/0101 |
| 2003/0227542 A1 * | 12/2003 | Zhang | G02B 27/017 348/E13.041 |

(Continued)

*Primary Examiner* — Ibrahim A Khan
(74) *Attorney, Agent, or Firm* — Treyz Law Group, P.C.; G. Victor Treyz; David K. Cole

(57) ABSTRACT

A head-mounted device may have displays that provide images. Waveguides may be used in conveying the images to eye boxes. The waveguides may overlap lenses in a glasses frame or other head-mounted support structure. The waveguides and lenses may be transparent. This allows real-world objects to be viewed from the eye boxes. Infrared-light reflectors may overlap the lenses. Gaze tracking system light sources may supply infrared light that reflects from the infrared-light reflectors to the eye boxes to illuminate a user's eyes. Gaze tracking system cameras capture gaze tracking images of the eyes from the eye boxes to track the user's gaze. Fiducials associated with the infrared-light reflectors may be monitored using the gaze tracking system cameras. This allows components such as the gaze tracking system cameras to be calibrated.

23 Claims, 13 Drawing Sheets

(56) References Cited

U.S. PATENT DOCUMENTS

| | | | |
|---|---|---|---|
| 2013/0187943 A1* | 7/2013 | Bohn | G02B 27/64 345/619 |
| 2015/0205135 A1* | 7/2015 | Border | G06V 20/20 359/630 |
| 2016/0026253 A1 | 1/2016 | Bradski et al. | |
| 2017/0045741 A1* | 2/2017 | Raffle | G02B 27/0172 |
| 2018/0008141 A1 | 1/2018 | Krueger | |
| 2018/0084232 A1 | 3/2018 | Belenkii et al. | |
| 2018/0113508 A1* | 4/2018 | Berkner-Cieslicki | G02B 27/0172 |
| 2018/0157908 A1* | 6/2018 | Sahlsten | G06V 40/19 |
| 2019/0050051 A1* | 2/2019 | Cirucci | G02B 5/08 |
| 2019/0253700 A1* | 8/2019 | Tornéus | G06F 3/013 |
| 2021/0096385 A1* | 4/2021 | Gupta | G02B 27/0025 |
| 2021/0263307 A1* | 8/2021 | Rotariu | G02B 26/0816 |
| 2021/0318558 A1* | 10/2021 | Tzvieli | G02B 27/0176 |

\* cited by examiner

HEAD-MOUNTED DISPLAY SYSTEMS WITH GAZE TRACKER ALIGNMENT MONITORING

This application claims the benefit of provisional patent application No. 63/062,347, filed Aug. 6, 2020, which is hereby incorporated by reference herein in its entirety.

FIELD

This relates generally to electronic devices, and, more particularly, to electronic devices such as head-mounted devices.

BACKGROUND

Electronic devices such as head-mounted devices may have displays for displaying images. The displays may be housed in a head-mounted support structure.

SUMMARY

A head-mounted device such as a pair of glasses may have displays for displaying computer-generated content. Waveguides may supply the computer-generated content to a user for viewing while allowing the user to view the real world. Gaze tracking systems may monitor the user's gaze.

The displays of the head-mounted device may supply left and right images to left and right eye boxes. Left and right waveguides may be used in conveying the left and right images to the left and right eye boxes. The left and right waveguides may be transparent. This allows real-world images to be viewed through the left waveguide from the left eye box and through the right waveguide from the right eye box.

Left and right infrared-light reflectors may overlap the left and right waveguides in front of the left and right eye boxes. Left and right gaze tracking system light sources may supply left and right infrared light that reflects respectively from the left and right infrared-light reflectors to the left and right eye boxes. Left and right gaze tracking system cameras may capture left and right gaze tracking images that reflect from the left and right infrared-light reflectors from the left and right eye boxes, respectively.

Fiducials associated with the left and right infrared-light reflectors may be monitored using the left and right gaze tracking system cameras so that the cameras can be calibrated. The fiducials may be formed from patterned portions of the infrared-light reflectors or other fiducial structures.

DETAILED DESCRIPTION

Electronic devices such as head-mounted devices may include displays and other components for presenting content to users. A head-mounted device may have head-mounted support structures that allow the head-mounted device to be worn on a user's head. The head-mounted support structures may support optical components such as displays for displaying visual content and front-facing cameras for capturing real-world images. The head-mounted device may have gaze tracking systems for monitoring a user's gaze. Fiducials may be provided on the head-mounted device and used in performing calibration operations. For example, the gaze tracking systems may be calibrated using the fiducials.

Figure 1:
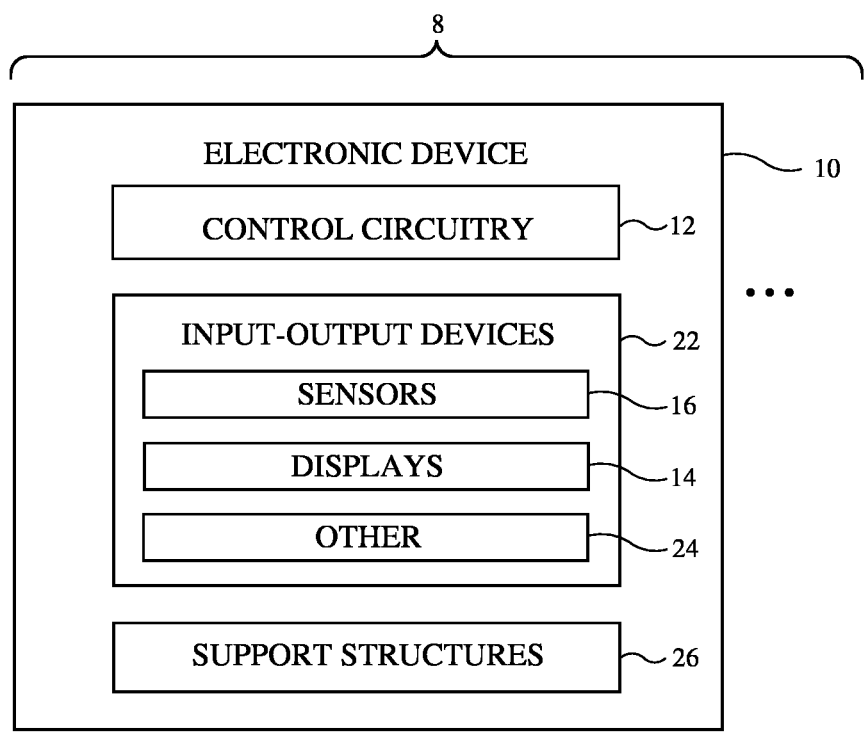
FIG. 1 is a schematic diagram of an illustrative electronic device such as a head-mounted display device in accordance with an embodiment.

A schematic diagram of an illustrative system that may include a head-mounted device is shown in FIG. 1. As shown in FIG. 1, system 8 may include one or more electronic devices such as electronic device 10. The electronic devices of system 8 may include computers, cellular telephones, head-mounted devices, wristwatch devices, and other electronic devices. Configurations in which electronic device 10 is a head-mounted device are sometimes described herein as an example.

As shown in FIG. 1, electronic devices such as electronic device 10 may have control circuitry 12. Control circuitry 12 may include storage and processing circuitry for controlling the operation of device 10. Circuitry 12 may include storage such as hard disk drive storage, nonvolatile memory (e.g., electrically-programmable-read-only memory configured to form a solid-state drive), volatile memory (e.g., static or dynamic random-access-memory), etc. Processing circuitry in control circuitry 12 may be based on one or more microprocessors, microcontrollers, digital signal processors, baseband processors, power management units, audio chips, graphics processing units, application specific integrated circuits, and other integrated circuits. Software code may be stored on storage in circuitry 12 and run on processing circuitry in circuitry 12 to implement control operations for device 10 (e.g., data gathering operations, operations involving the adjustment of the components of device 10 using control signals, etc.). Control circuitry 12 may include wired and wireless communications circuitry. For example, control circuitry 12 may include radio-frequency transceiver circuitry such as cellular telephone transceiver circuitry, wireless local area network transceiver circuitry (e.g., WiFi® circuitry), millimeter wave transceiver circuitry, and/or other wireless communications circuitry.

During operation, the communications circuitry of the devices in system 8 (e.g., the communications circuitry of control circuitry 12 of device 10), may be used to support communication between the electronic devices. For example, one electronic device may transmit video data, audio data, and/or other data to another electronic device in system 8. Electronic devices in system 8 may use wired and/or wireless communications circuitry to communicate through one or more communications networks (e.g., the internet, local area networks, etc.). The communications circuitry may be used to allow data to be received by device 10 from external equipment (e.g., a tethered computer, a portable device such as a handheld device or laptop computer, online computing equipment such as a remote server or other remote computing equipment, or other electrical equipment) and/or to provide data to external equipment.

Device 10 may include input-output devices 22. Input-output devices 22 may be used to allow a user to provide device 10 with user input. Input-output devices 22 may also be used to gather information on the environment in which device 10 is operating. Output components in devices 22 may allow device 10 to provide a user with output and may be used to communicate with external electrical equipment.

As shown in FIG. 1, input-output devices 22 may include one or more displays such as displays 14. In some configurations, device 10 includes left and right display devices (e.g., left and right components such as left and right scanning mirror display devices or other image projectors, liquid-crystal-on-silicon display devices, digital mirror devices, or other reflective display devices, left and right display panels based on light-emitting diode pixel arrays (e.g., organic light-emitting display panels or display devices based on pixel arrays formed from crystalline semiconductor light-emitting diode dies), liquid crystal display panels, and/or or other left and right display devices that provide images to left and right eye boxes for viewing by the user's left and right eyes, respectively. Illustrative configurations in which device 10 has left and right display devices such as left and right projectors that provide respective left and right images for a user's left and right eyes may sometimes be described herein as an example.

Displays 14 are used to display visual content for a user of device 10. The content that is presented on displays 14 may include virtual objects and other content that is provided to displays 14 by control circuitry 12. This virtual content may sometimes be referred to as computer-generated content. Computer-generated content may be displayed in the absence of real-world content or may be combined with real-world content. In some configurations, a real-world image may be captured by a camera (e.g., a forward-facing camera, sometimes referred to as a front-facing camera) so that computer-generated content may be electronically overlaid on portions of the real-world image (e.g., when device 10 is a pair of virtual reality goggles with an opaque display). In other configurations, an optical coupling system may be used to allow computer-generated content to be optically overlaid on top of a real-world image. As an example, device 10 may have a see-through display system that provides a computer-generated image to a user through a beam splitter, prism, holographic coupler, diffraction grating, or other optical coupler (e.g., an output coupler on a waveguide that is being used to provide computer-generated images to the user) while allowing the user to view real-world objects through the optical coupler and other transparent structures (e.g., transparent waveguide structures, vision-correction lenses and/or other lenses, etc.).

Input-output circuitry 22 may include sensors 16. Sensors 16 may include, for example, three-dimensional sensors (e.g., three-dimensional image sensors such as structured light sensors that emit beams of light and that use two-dimensional digital image sensors to gather image data for three-dimensional images from light spots that are produced when a target is illuminated by the beams of light, binocular three-dimensional image sensors that gather three-dimensional images using two or more cameras in a binocular imaging arrangement, three-dimensional lidar (light detection and ranging) sensors, three-dimensional radio-frequency sensors, or other sensors that gather three-dimensional image data), cameras (e.g., infrared and/or visible digital image sensors), gaze tracking sensors (e.g., a gaze tracking system based on an image sensor and, if desired, a light source that emits one or more beams of light that are tracked using the image sensor after reflecting from a user's eyes), touch sensors, capacitive proximity sensors, light-based (optical) proximity sensors, other proximity sensors, force sensors, sensors such as contact sensors based on switches, gas sensors, pressure sensors, moisture sensors, magnetic sensors, audio sensors (microphones), ambient light sensors, microphones for gathering voice commands and other audio input, sensors that are configured to gather information on motion, position, and/or orientation (e.g., accelerometers, gyroscopes, compasses, and/or inertial measurement units that include all of these sensors or a subset of one or two of these sensors), and/or other sensors.

User input and other information may be gathered using sensors and other input devices in input-output devices 22. If desired, input-output devices 22 may include other devices 24 such as haptic output devices (e.g., vibrating components), light-emitting diodes and other light sources, speakers such as ear speakers for producing audio output, circuits for receiving wireless power, circuits for transmitting power wirelessly to other devices, batteries and other energy storage devices (e.g., capacitors), joysticks, buttons, and/or other components.

Electronic device 10 may have housing structures (e.g., housing walls, straps, etc.), as shown by illustrative support structures 26 of FIG. 1. In configurations in which electronic device 10 is a head-mounted device (e.g., a pair of glasses, goggles, a helmet, a hat, etc.), support structures 26 may include head-mounted support structures (e.g., a helmet housing, head straps, temples in a pair of eyeglasses, goggle housing structures, and/or other head-mounted structures). The head-mounted support structures may be configured to be worn on a head of a user during operation of device 10 and may support displays 14, sensors 16, other components 24, other input-output devices 22, and control circuitry 12.

Figure 2:
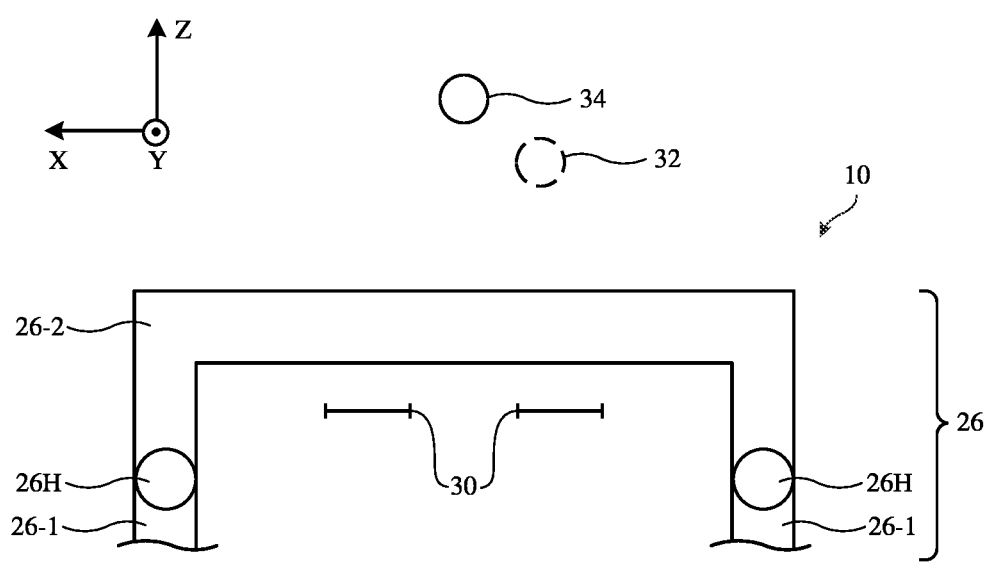
FIG. 2 is a top view of an illustrative head-mounted device in accordance with an embodiment.

FIG. 2 is a top view of electronic device 10 in an illustrative configuration in which electronic device 10 is a head-mounted device. As shown in FIG. 2, electronic device 10 may include head-mounted support structure 26 to house the components of device 10 and to support device 10 on a user's head. Support structure 26 may include, for example, structures that form housing walls and other structures at the front of device 10 (e.g., support structures 26-2, which may form glasses frame structures such as a nose bridge, end pieces, and/or other housing structures) and additional structures such as straps, temples, or other supplemental support structures (e.g., support structures 26-1) that help to hold the main unit and the components in the main unit on a user's face so that the user's eyes are located within eye boxes 30. If desired, support structure 26 may include hinges such as hinges 26H. Support structures 26-1 may be coupled to support structures 26-2 using hinges 26H (e.g., so that the temples or other structures in device 10 can be folded parallel to the frame at the front of device 10 when not in use).

During operation of device 10, images are presented to a user's eyes in eye boxes 30. Eye boxes 30 include a left eye box that receives a left image and a right eye box that receives a right image. Device 10 may include a left display system with a left display 14 that presents the left image to the left eye box and a right display system with a right display 14 that presents the right image to the right eye box. In an illustrative configuration, each display system may have an optical combiner assembly that helps combine display images (e.g., computer-generated image 32 of FIG. 2, sometimes referred to as a virtual image) with real-world image light (e.g., light from real-world objects such as object 34 of FIG. 2). Optical combiner assemblies may include optical couplers, waveguides, and/or other components.

Figure 3:
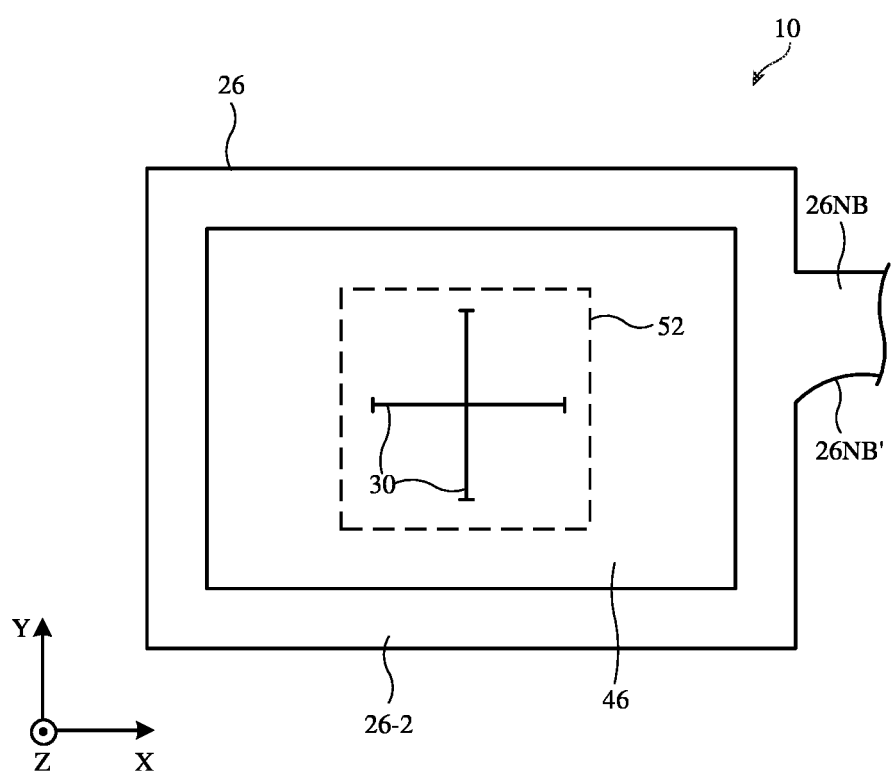
FIG. 3 is a front view of a portion of an illustrative head-mounted device in accordance with an embodiment.

FIG. 3 is a front view of a portion of an illustrative head-mounted device. In the example of FIG. 1, the structures of device 10 have been configured to form a pair of glasses. If desired, device 10 may have portions forming straps, googles, structures for hats or helmets, and/or other head-mounted housings.

As shown in FIG. 3, electronic device 10 may include head-mounted support structure 26 to house the components of device 10 and to support device 10 on a user's head. Support structure 26 may include, for example, portion 26-2 (sometimes referred to as a glasses frame, main support member, main housing portion, or main portion) that rests in front of a user's face during use. Portion 26-2 may include a nose bridge portion such as portion 26NB that connects left and right sides of portion 26M and has a surface such as curved nose-shaped surface 26NB' that supports portion 26-2 on the user's nose. Left and right lenses such as illustrative lens 46 may be supported by portion 26-2 in front of the user's left and right eyes, respectively (e.g., an eye located in eye box 30). Support structures such as structures 26-1 of FIG. 2 may protrude rearwardly from structure 26 to extend along the sides of a user's head and over the user's ears (e.g., into the page in the orientation of FIG. 3). Portions of structure 26 such as structures 26-1 of FIG. 2, which may sometimes be referred to as glasses temples or elongated side support members, may be coupled to structure 26-2 by hinges 26H of FIG. 2 (as an example).

During operation of device 10, images may be presented to a user's eyes in eye boxes such as eye box 30. For example, each side of device 10 may have a display system that includes a display projector or other display device (e.g., a scanning mirror display or other display device) that creates a computer-generated image. Using an input coupler (e.g., a prism or holographic input coupler), this image (e.g., the image projected from the display projector or other display device) may be coupled into a waveguide that extends across an associated lens 46 in front of an associated eye box 30. The waveguide may form part of lens 46 and/or may be supported by a separate lens structure. The image from the display may travel through the waveguide in accordance with the principal of total internal reflection. The display system may include an output coupler such as output coupler 52 (e.g. a holographic output coupler or other suitable output coupler at the end of the waveguide) that overlaps the portion of lens 46 in front of eye box 30 and directs the image out of the waveguide towards the user's eye in eye box 30.

Eye boxes 30 may include a left eye box that receives a left image and a right eye box that receives a right image. FIG. 3 shows only a single lens overlapping a single eye box 30. Device 10 preferably includes a left display system that presents the left image to the left eye box and a right display system that presents the right image to the right eye box.

In addition to serving as a waveguide or supporting substrate for a waveguide to help route image light to eye boxes 30, lenses 46 and the waveguides and output couplers overlapping lenses 46 may form optical combiner assemblies. Lenses 46 and the overlapping waveguides and output couplers in device 10 may, for example, be formed from clear material such as transparent polymer or glass that allows the user to view real-world objects through lenses 46. In this way, the optical system formed by the waveguide, output coupler, and lens 46 overlapping each eye box can be used to combine display images (e.g., computer-generated content from display devices, which may sometimes be referred to as virtual image content, virtual images, or computer-generated images) with real-world image light (e.g., light from real-world objects, sometimes referred to as real-world images).

Figure 4:
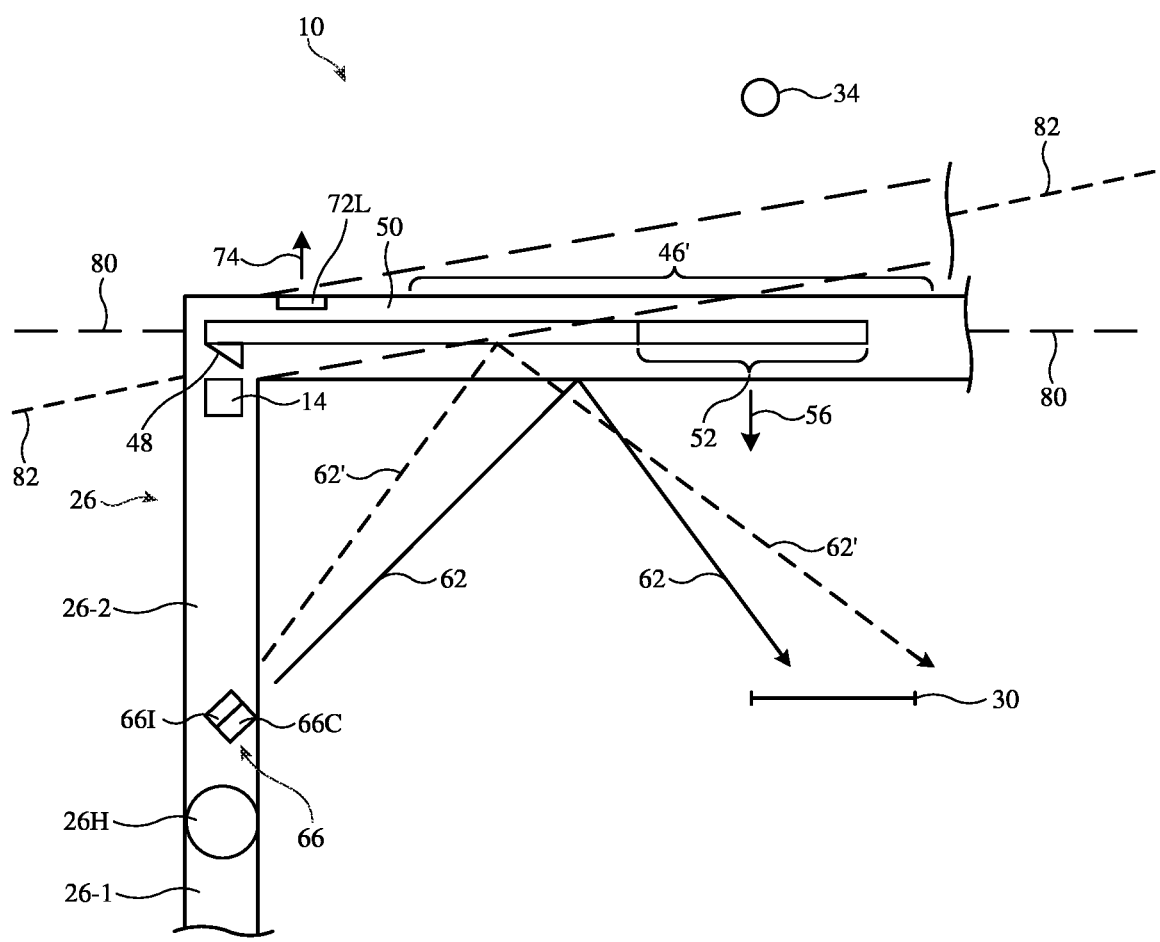
FIG. 4 is a top view of a portion of an illustrative head-mounted device with a gaze tracking system in accordance with an embodiment.

Displays 14 may, if desired, include display devices such as projectors. A portion (e.g., a left-hand portion) of an illustrative head-mounted device with a projector display is shown in FIG. 4. As shown in FIG. 4, device 10 may include head-mounted support structure 26. Structure 26-2 (e.g., a frame) may contain display (projector) 14. During operation, display 14 provides an image that is coupled into waveguide 50 by an input coupler such as input coupler 48. Waveguide 50 may be formed from a transparent layer of polymer, glass, or other clear material and may have an elongated strip shape that extends along axis 80 (e.g., across the front of a user's face). Input coupler 48 and output coupler 52 may be formed from gratings, holograms, prisms, and/or other optical coupling structures and these structures may be attached to the exterior of waveguide 50 and/or may be formed in the material of waveguide 50.

As shown in FIG. 4, an output coupler such as output coupler 52 may be formed along part of waveguide 50 overlapping eye box 30. Output coupler 52 may be transparent to allow a user to view real-world objects such as object 34 through output coupler 52 (e.g., real-world image light from object 34 may pass through output coupler 52 to eye box 30).

Input coupler 48 may be configured to receive the image from display 14 and to couple the received image into waveguide 50. The image then travels along the length of waveguide 50 in accordance with the principal of total internal reflection to output coupler 52. Output coupler 52 may direct the guided image light rearwardly out of waveguide 50 towards eye box 30 in direction 56.

While a user is viewing an image in eye box 30, the direction in which the user's eye is pointed (sometimes referred to as the user's gaze or direction of gaze) may be monitored using gaze tracking system 66. Gaze tracking system 66 may include a camera such as gaze tracking system camera 66C (e.g., a camera that is sensitive to infrared light and/or visible light) that views the user's eye in eye box 30 along optical path 62. In some configurations, gaze tracking system 66 may have an associated light source such as gaze tracking system light source 66I (e.g., one or more infrared and/or visible light-emitting diodes or other light-emitting devices). Light from light source 66I (e.g., infrared light) may travel along optical path 62 to eye box 30 to illuminate the user's eye in eye box 30.

Optical path 62 may include a first segment between system 66 and waveguide 50 and a second segment between waveguide 50 and eye box 30. An infrared-light reflector or other reflector in support structure 26-2 (e.g., a thin-film interference filter reflector on waveguide 50 that is configured to reflect infrared light while passing visible light, a diffraction grating such as a holographic grating or other grating, and/or other reflecting structure) may be configured to reflect light associated with light source 661. For example, light source 661 may emit infrared light and the reflector may be configured to reflect this infrared light. As shown in FIG. 4, the infrared light from light source 661 may travel along the first segment of path 62 from light source 661 to the reflector in structure 26-2 and, after reflecting from the reflector, may travel along the second segment of path 62 to eye box 30. This illuminates the user's eye with infrared light.

While the user's eyes are being illuminated in this way, light (e.g., infrared image light) associated with the user's illuminated eye in eye box 30 may travel along the second segment of path 62, may reflect from the reflector, and may subsequently travel along the first segment of path 62 to infrared camera 66C of gaze tracking system 66. Accordingly, infrared light may be used to illuminate the user's eye and provide a gaze tracking image to system 66 (e.g., an image sensor in system 66 that is sensitive to infrared light). By monitoring direct light-emitting device reflections (glints) and/or the shape of the user's pupil in infrared images captured with gaze tracking system 66, system 66 may be used to monitor the direction of the user's gaze. This information may be used as an input to device 10 during operation of device 10 (e.g., to determine the location in a scene to which a user's attention is directed), may be used in determining which portion of the image from display 14 should be provided with enhanced resolution in a foveated display rendering system, and/or may otherwise be used in operating device 10.

Device 10 may, if desired, have one or more forward-facing cameras. For example, device 10 may have left and right forward-facing cameras mounted in a forward-facing direction on structure 26-2, such as illustrative left forward-facing camera 72L, which may be used to capture images in forward direction 74.

It is possible for support structure 26 to be subjected to excessive stress (e.g., during an undesired drop event, etc.). The excessive stress may deform device 10. For example, the front of structures 26-2 (e.g., the glasses frame in a pair of glasses) may initially be aligned with axis 80, but, following exposure to excessive stress, may become misaligned and extend along axis 82 instead of axis 80. This can cause path 62 to become misaligned with respect to eye box 30 and the user's eye in eye box 30 (see, e.g., misaligned path 62') and can otherwise cause gaze tracking system 66 to become misaligned (e.g., misaligned with respect to display 14 and forward-facing camera 72L). This can adversely affect the operation of gaze tracking system 66.

To ensure that gaze tracking system is satisfactorily aligned with eye box 30, the infrared-light reflector, the image presented in eye box 30 by display 14, and/or with the images captured by forward-facing camera 72L, even after device 10 is subjected to excessive stress that deforms structures 26-2 as shown in FIG. 4, gaze tracking system 66 may be calibrated. In an illustrative configuration, device 10 may be provide with one or more fiducials (sometimes referred to as alignment marks, etc.). These fiducials, may be visible to camera 66C and may be formed on structure 26-2 (e.g., a frame that supports lenses in front of eye boxes 30), may be formed on waveguide 50, may be formed on output coupler 52, may be formed on a transparent lens such as transparent lens 46 of FIG. 3 mounted in an opening in structure 26-2 such as an opening in lens region 46' of FIG. 4, may be formed on a vision correction lens, may be formed as part of an infrared-light reflector, and/or may be formed on, coupled to, overlapping with, aligned with, and/or otherwise associated with other structures associated with the display system(s), forward-facing camera system(s), infrared-light reflectors, waveguides, output couplers, eye boxes, and/or other portions of device 10.

In the event that device 10 is dropped or otherwise subjected to stress, there is a potential risk that the front of structure 26-2 and the display, waveguide structures, and forward-facing camera associated with the front of structure 26-2 may become misaligned with respect to gaze tracking system 66 and/or each other. There is also a potential for vision correction lenses that are coupled to structure 26-2 to become misaligned. Fiducials can be placed on one or more components of device 10 to facilitate misalignment detection (e.g., detection of misalignment using measurements made with gaze tracking system 66) and thereby allow compensating action to be taken (e.g., by adjusting gaze tracking system 66 to recalibrate for the shift in position between system 66 and the display system, by otherwise adjusting components to compensate for detected misalignment, by alerting a user that a repair is needed, etc.). Fiducials may be located on waveguide 50, on structure 26-2, on fixed or removable vision correction lenses, and/or other device structures. The infrared reflector that is used in reflecting light between system 66 and eye box 30 may be formed on waveguide 50, a vision correction lens, structure 26-2 or a structure coupled to structure 26-2, etc. and fiducials may, if desired, be formed by patterning the infrared reflector.

Accordingly, one or more fiducials may be provided in device 10 including one or more fiducials on waveguide 50, one or more fiducials on vision-correction lenses, one or more fiducials on the frame of device 10 (e.g., structure 26-2), and/or one or more fiducials on any two or all three of these device structures (as examples). Images of these fiducials may be captured using system 66 during operation of device 10.

In an illustrative scenario, one or more fiducials are formed on waveguide 50. This allows device 10 to calibrate the position of waveguide 50 (and therefore the display system formed from display 14 and waveguide 50) relative to system 66. In some situations, system 66 may not move significantly relative to structure 26-2 during a drop event. This allows measurements of the fiducials on waveguide 50 that are made with system 66 to detect any changes in position of waveguide 50 relative to system 66.

In another illustrative scenario, fiducials are formed on waveguide 50, fiducials are formed on removable vision correction lenses that are fixedly or removably coupled to device 10 in front of eye boxes 30, and fiducials are placed on the frame of device 10 (e.g., structure 26-2). With a fiducial on structure 26-2, the measured position of this fiducial may serve as a fixed reference for system 66. If system 66, waveguide 50, and the vision correction lenses all move due to a drop event (assuming structure 26-2 does not permanently bend), the fiducial on the waveguide, vision correction lenses, and frame will help system 66 gather position measurements that can be used to at least partially recalibrate device 10. This is because the frame fiducial allows a determination of a new absolute position (fixed reference) for system 66 from which system 66 can measure the new positions of the waveguide and vision correction lenses. By comparing the new and old values of the absolute position of system 66 and the relative position of system 66 to the vision correction lenses and of system 66 to waveguide 50, device 10 can determine whether calibration adjustments may be made in software (e.g., by calibrating system 66) or whether a user should be alerted to repair device 10.

In configurations in which vision correction lenses are permanently mounted to structure 26-2 and form an integral portion of the lenses in front of the user's eyes (rather than being removably attached using clips or magnets), it may be desirable to only provide one or more fiducials on waveguide 50 and on the vision correction lenses. This is because the fiducials on the vision correction lenses may be used by system 66 as fixed reference points.

In general, any suitable combination of fiducials may be used to facilitate misalignment measurements by system 66. By measuring the positions of the fiducials in this way with camera 66C, device 10 can determine the location of the structures that are supporting the components associated with the display (e.g., waveguide 50), forward-facing camera system, vision correction lenses, and/or infrared reflector relative to gaze tracking system 66 and can calibrate gaze tracking system 66 or other components accordingly (e.g., to calibrate gaze tracing system 66 to account for any shifts in gaze tracking images that may arise due to the movement of path 62 to location 62' of FIG. 4 as a result of deformation of structure 26, etc.).

Figure 5:
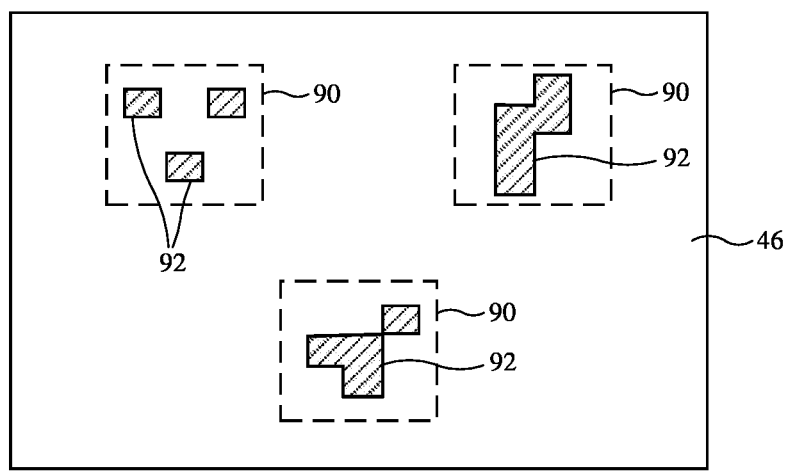
FIG. 5 is a rear view of a portion of an illustrative head-mounted device with gaze tracker calibration fiducials in accordance with an embodiment.

Fiducials can be formed from reflective structures and/or light-absorbing structures and may have any suitable shape. Consider, as an example, the arrangement of FIG. 5. In the example of FIG. 5, lens 46 is overlapped by three fiducials 90, each of which has an identifiable pattern (e.g., a unique pattern). Portions 92 of fiducials 90 may, as an example, exhibit different amounts of light reflection, absorption, and/or transmission, across one or more visible light and/or infrared wavelengths relative to surrounding areas. As an example, some or all of the surface of lens 46 of FIG. 5 may be covered with an infrared-light reflector for reflecting light associated with gaze tracking system 66 (e.g., infrared light emitted by light source 661 and captured by an infrared image sensor in camera 66C). In this type of arrangement, areas 92 may correspond to regions with locally reduced infrared-light reflectivity (e.g., areas that may appear dark in the captured infrared images of glints on the user's eyes). The patterned infrared-light reflector may be formed on waveguide 50, on an output coupler on waveguide 50, on a vision correction lens removably or permanently affixed to or forming part of lens 46 and/or waveguide 50, and/or on part of the frame of device 10 (e.g., structure 26-2). Other arrangements may be used, if desired.

In the example of FIG. 5, each fiducial 90 has a recognizable pattern. This may help gaze tracking camera 66C identify each fiducial (e.g., using pattern recognition techniques). If desired, fiducials 90 may all have the same appearance and/or may have shapes such as circular shapes, square shapes, cross shapes, etc. When device 10 is subjected to excessive stress that causes structures 26-2 to deform (e.g., to a state where structures 26-2 extend along axis 82 of FIG. 4) or that otherwise cause components in device 10 to shift position, gaze tracking system 66 (e.g., camera 66C) can detect the corresponding movement of fiducials 90 from their initial positions. Movement of fiducials 90 may, as an example, cause the pattern of fiducials 90 that is visible to camera 66C to exhibit geometric distortion (e.g., due to perspective-induced image warping). The distortion may include, for example, a lateral image shift, image stretching, rotation, etc.). By counteracting this distortion (e.g., by applying compensating image warping to the images acquired by camera 66C to remove distortion imposed due to component misalignment), gaze tracking system 66 can compensate for misalignment between gaze tracking system 66 and the infrared-light reflector, resulting misalignment between gaze tracking system 66 and eye boxes 30, and/or misalignment between system 66 and the components on structures 26-2 such as display 14 and the optical coupling system formed from input coupler 48, waveguide 50, and output coupler 52 and forward-facing camera 72L.

Figure 6:
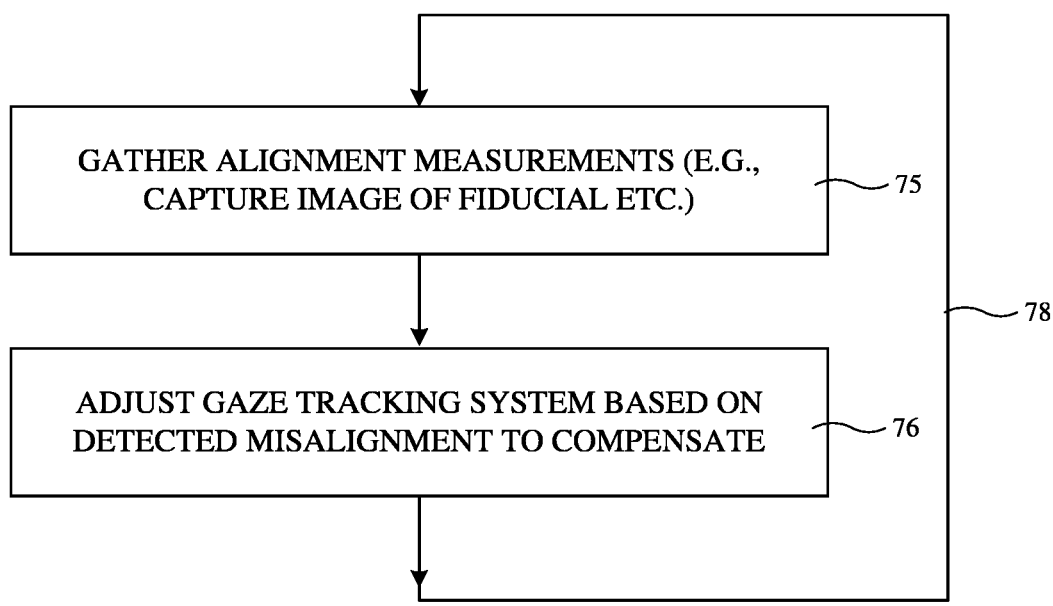
FIG. 6 is a flow chart of illustrative operations involved in calibrating a gaze tracking system in accordance with an embodiment.

Illustrative operations involved in operating head-mounted device 10 are shown in FIG. 6.

During the operations of block 75, sensors 16 (e.g., gaze tracking system 66) may be used to gather information on the positions of fiducials 90 in the field of view of camera 66C and thereby measure associated misalignment of gaze tracking system 66 and other portions of device 10. In measuring misalignment, system 66 may capture an image that includes fiducials 90 and may measure whether fiducials 90 have moved from their expected positions.

These fiducial measurements of gaze tracking system misalignment may then be used, during the operations of block 76 to warp images from gaze tracking camera 66C to compensate for the misalignment. In particular, during the operations of block 76, control circuitry 12 may process image data (e.g., captured gaze tracking camera images from cameras 66C on left and/or right of device 10) to compensate for misalignment measured in the fiducial images gathered using cameras 66C on the left and/or right sides of device 10. For example, if it is determined that deformation of support 26 has caused a left gaze tracking camera image to shift leftward relative to a left eye box 30, a compensating rightward shift can be applied to the gaze tracking camera image data from the left gaze tracking camera to ensure that the compensated left image is no longer shifted relative to the left eye box 30 but rather is aligned with eye box 30 as if there were no misalignment due to deformation of structures 26-2. The image warping transforms that are applied during misalignment compensation operations may include geometrical transforms such as shifts, shears, rotations, etc.

As shown by line 78, the fiducial measurements of block 75 to detect misalignment and the corresponding misalignment compensation gaze tracking system image processing adjustments that are performed at block 76 may be performed repeatedly (e.g., periodically such as every T seconds, where T is at least 1 microsecond, at least 1 ms, at least 1 s, at least 100 s, less than 100 hours, less than 1 hour, less than 10 minutes, or other suitable time period), upon detection of a drop event, upon power up, in response to a user-initiated calibration request, etc.

Figure 7:
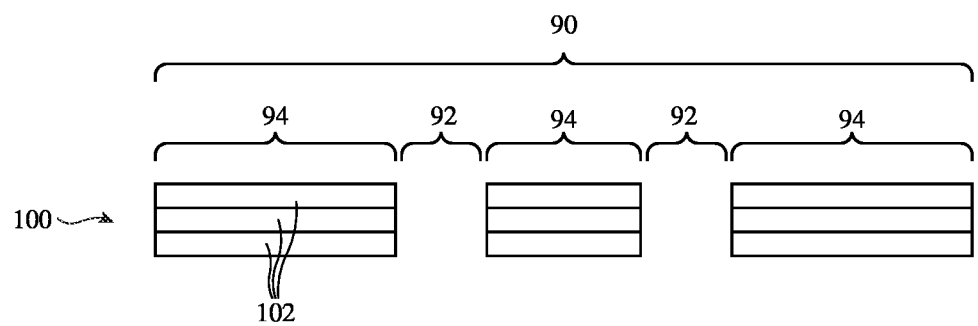
FIGS. 7, 8, and 9 are cross-sectional side views of illustrative structures that may be used in forming fiducials in accordance with an embodiment.
Figure 8:
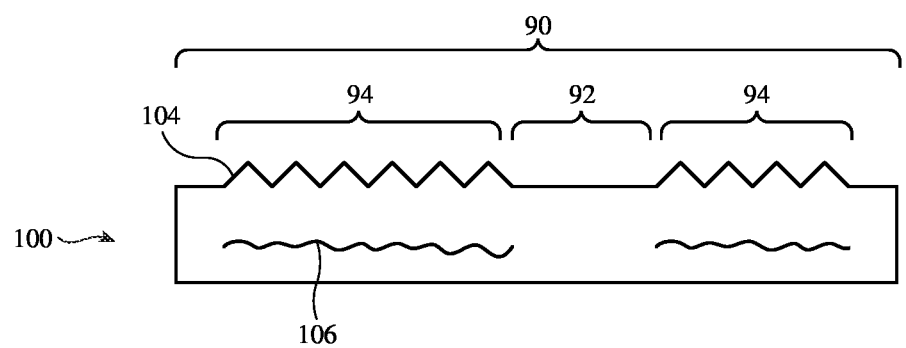
Figure 9:
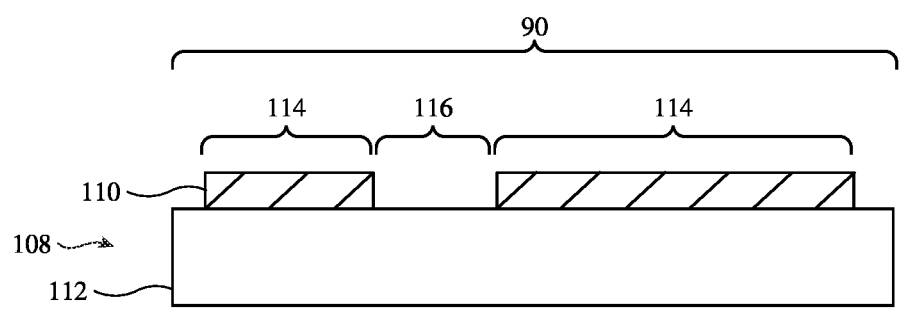

FIGS. 7, 8, and 9 are cross-sectional side views of illustrative structures that may be used in forming fiducials. The fiducials of FIGS. 7, 8, and 9 may be formed on waveguide 50, on structure 26-2, on a permanently fixed or a removable vision correction lens, may be formed within an infrared reflector for system 66, and/or may be formed on other structures of device 10 and/or combinations of at least two or at least three of these structures.

In the example of FIG. 7, fiducial 90 has been formed by patterning layer 100 to form reflective area 94 and non-reflective (less-reflective) area 92. Layer 100 may be formed from a thin-film dielectric stack with multiple dielectric layers 102. Dielectric layers 102 may have refractive index values (e.g., alternating high and low refractive index values) and/or thicknesses that configure layer 100 (e.g., reflective area 94) to reflect infrared light associated with the operation of gaze tracking system 66 (e.g., infrared light at a wavelength of 850-1300 nm, at least 850 nm, at least 900 nm, 940 nm, 900-1050 nm, less than 1200 nm, less than 1100 nm, 850-1000 nm, or other suitable infrared light), while simultaneously allowing visible light associated with real-world objects such as real-world object 34 (FIG. 4) to pass. Area 92 may be formed by selectively removing some or all of layers 102 from layer 100. This makes area 92 non-reflective or at least less reflective to infrared light than area 94, thereby forming a desired fiducial pattern for fiducial 90 at infrared light wavelengths. Visible light may pass through portion 92. The infrared reflectively of layer 100 (except in area 92, which may occupy a relatively small fraction of layer 100) and the visible light transparency of layer 100 allow layer 100 to be used as the infrared reflector in structure 26-2.

In the example of FIG. 8, layer 100 has diffraction gratings. The gratings may include surface gratings 104 and/or gratings 106 embedded in layer 100 (e.g., holographic gratings). In area 94, the grating structures are configured to reflect infrared light and pass visible light. In area 92, the gratings are absent, so infrared light is not reflected and both infrared light and visible light pass through layer 100. By patterning areas 92 and 94, a desired fiducial pattern for fiducial 90 is formed. Layer 100 of FIG. 8 may form the infrared reflector in structure 26-2.

FIG. 9 shows how fiducial 90 may be formed in a layer (e.g., layer 108) by selectively patterning a coating layer such as coating layer 110 on substrate 112 (e.g., one or more transparent support layers). Coating layer 110 may be formed from metal, light-absorbing material such as opaque ink or other coating material. Portions of layer 110 may be selectively removed (e.g., in area 116) to form a desired pattern for fiducial 90. The portions of layer 108 where coating 110 has been removed (area 116) and the portions of fiducial 90 where coating 110 has not been removed (area 114) may exhibit different optical properties (e.g., different amounts of infrared and/or visible transmission and reflection). As an example, both areas 114 and 116 may be transparent at visible wavelengths, whereas area 114 may be more reflective than area 116 at infrared wavelengths and/or area 114 may be less reflective than area 116 at infrared wavelengths. If desired, layer 108 may form the infrared reflector in structure 26-2.

Figure 10:
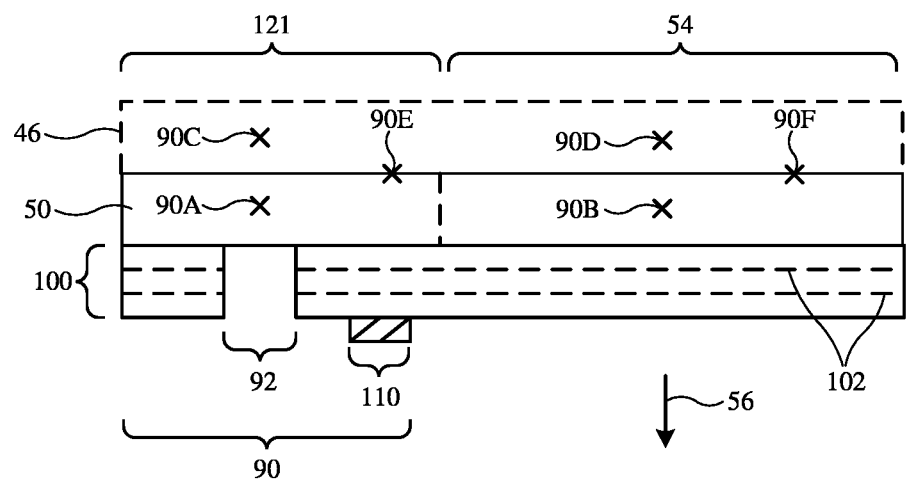
FIG. 10 is a cross-sectional side view of a portion of a head-mounted device showing illustrative fiducial locations in accordance with embodiments.

FIG. 10 shows illustrative fiducial and infrared reflector arrangements that may be used for device 10. As shown in FIG. 10, waveguide 50 may have a first portion (e.g., in region 121) that is not overlapped by output coupler 52 and a second portion that is overlapped by output coupler 52. Output coupler 52 may be formed from a diffraction grating (e.g., a surface grating, a hologram formed in or on layer 50, etc.), and/or other structures for coupling guided image light out of waveguide 50 in direction 56. Layer 100 may be formed on the surface of waveguide 50 (as an example) and may be formed from patterned layers 102 and/or from grating structures of the type shown in FIG. 8. Optional coating 110 may be formed on layer 100 and/or directly on waveguide 50. The patterns used for forming coating 110 and/or layer 100 may be used to form one or more fiducials. If desired, layer 100 and/or coating 110 may be formed on a lens such as lens 46 (e.g., a lens formed partly using waveguide 50 or a transparent substrate that is separate from waveguide 50) in addition to or instead of on waveguide 50.

Fiducials 90 may, in general, be formed so as to overlap the outline of infrared-light reflector, output coupler 52, the portion of waveguide 50 without output coupler 52, and/or to overlap portions of lens 46 without overlapping either waveguide 50 or output coupler 52. Lens 46 may be formed by one or more transparent structures (e.g., one or more transparent glass and/or polymer layers) and may or may not have an associated lens power. Lens 46 may be used to help support waveguide 50 and may be separate from waveguide 50 and/or portions of waveguide 50 may be integrated into lens 46 and/or may form lens 46.

In addition to forming fiducials from patterned layers such as patterned layer 100 (FIG. 7 and/or FIG. 8) and/or patterned layer 108 (e.g., coating 110 of FIG. 9) that are located on a surface of lens 46 and/or waveguide 50 (and/or on other structures such as structure 26-2, a removable or permanently attached vision correction lens that is separate from or integral to lens 46, etc.), fiducials may be formed by laser marking, machining, deposition, etching and/or other patterning techniques that form fiducials in the bulk material forming waveguide 50 (e.g., in fiducial location 90A and/or fiducial location 90B), and/or in lens 46 (e.g., in fiducial location 90C and/or 90D), and/or on the surface of lens 46 and/or waveguide 50 (e.g., in fiducial location 90E and/or 90F). Fiducials 90 may also be formed on a support structure (e.g., a glasses frame) that forms part of structure 26-2, on a vision correction lens element, and/or elsewhere in device 10 within the field of view of cameras 66C.

Figure 11:
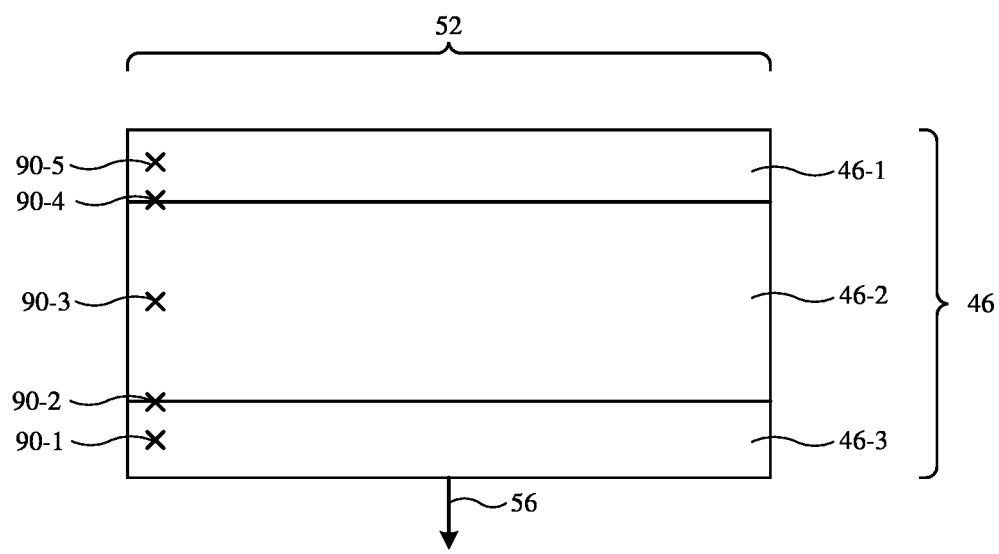
FIG. 11 is a cross-sectional side view of a portion of a head-mounted device with a vision correcting lens in accordance with an embodiment.

If desired, lens 46 may have multiple parts. As shown in FIG. 11, for example, lens 46 may include portions such as outer portion 46-1 and inner portion 46-3 and middle portion 46-2, between portions 46-1 and 46-3 (sometimes referred to as vision correction lens elements, vision correction lenses, etc.). Portion 46-2 may form a part of waveguide 50 and/or may be configured to support and/or receive a separate waveguide such as waveguide 50. Output coupler 52 may be located in portion 46-2 to direct images from display 14 out of waveguide 50 in direction 56. Portions 46-1 and 46-2 may have lens powers collectively configured to adjust the lens prescription of lens 46 to match a user's vision (e.g., to correct for refractive vision errors such as nearsightedness, farsightedness and/or astigmatism) when the user is viewing real-world objects. The lens power of lens portion 46-3 may be selected to accommodate user vision defects and/or to adjust a virtual image distance associated with computer-generated images (virtual images) being presented by display 14.

As shown in FIG. 11, fiducials 90 may be formed at location 90-5 within lens portion 46-1, at location 90-4 on a surface of portion 46-1 and/or a surface of portion 46-2, at location 90-3 within lens portion 46-2, at location 90-2 on a surface of portion 46-2 and/or a surface of portion 46-3, and/or at location 90-1 within lens portion 46-3 (as examples). Portions 46-1 and 46-2 may be customized for different users with different associated vision errors (e.g., by coupling user-specific portions 46-1 and/or 46-3 to portion 46-2 during manufacturing and/or by removably coupling user-specific portions 46-1 and/or 46-3 to portion 46-2 in the field (e.g., using magnets, screws or other fasteners, and/or other attachment mechanisms).

Figure 12:
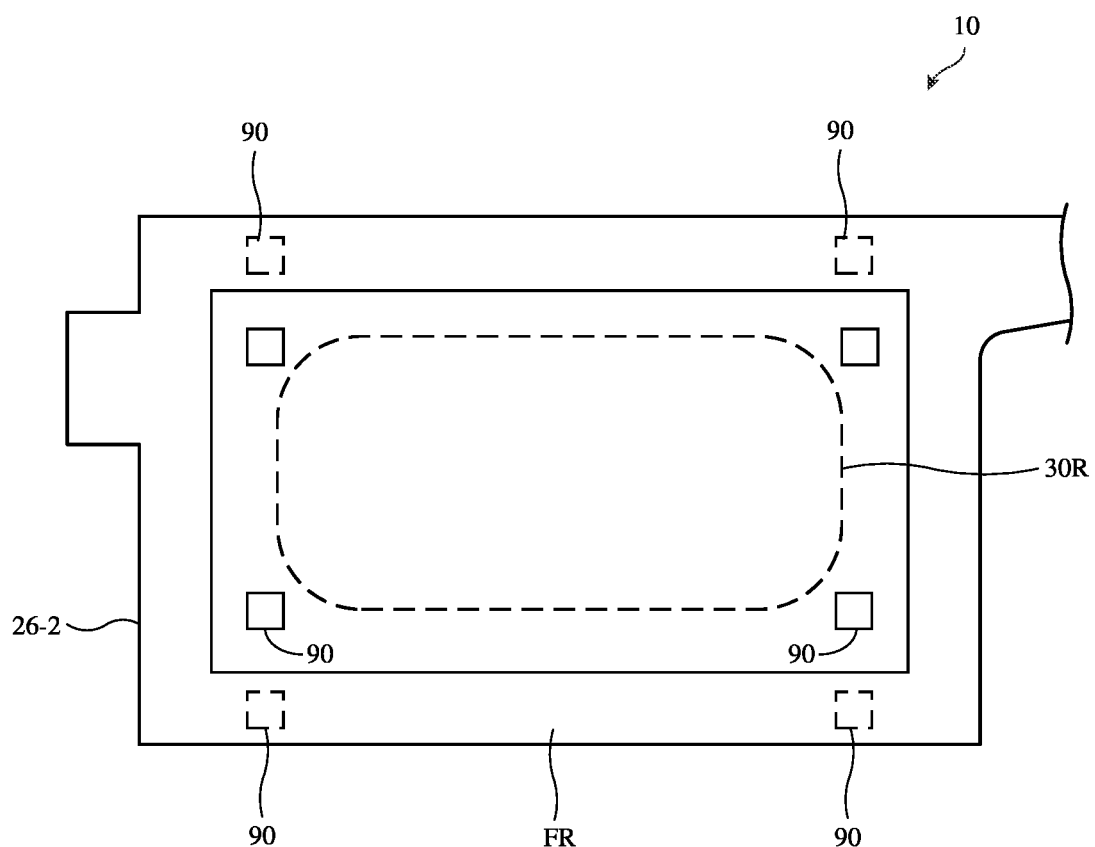
FIG. 12 is a front view of an illustrative head-mounted device with fiducials located outside of an eye box reflection area in accordance with an embodiment.

FIG. 12 is a front view of a portion of structure 26-2 of device 10 showing how fiducials 90 may, if desired, be located on a support structure such as a glasses frame FR surrounding lens 46 and/or may be located on lens 46 at locations that do not overlap eye box reflection area 30R, where infrared light reflects from the infrared reflector on lens 46 (and/or output coupler 52 and/or other structures overlapping lens 46) to and from eye box 30. Fiducials 90 may, as an example, be formed by patterning an infrared reflector layer or other layer(s) on the surface of a transparent lens member forming lens 46 and/or waveguide 50. In area 30R, the infrared reflector may reflect infrared light associated with gaze tracker 66 while passing real-world image light at visible wavelengths to eye box 30. At fiducials 90 (e.g., outside of area 30R), where portions of the infrared reflector have been selectively removed to form a desired fiducial pattern, infrared light (e.g., infrared light from portions of the user's face near eye box 30 that have been illuminated by infrared light from source 661) may be reflected to camera 66C except in the selectively removed areas. Visible light may pass through fiducials 90, if desired. In arrangements in which fiducials 90 are located outside of the area where infrared light reflects when passing between eye box 30 and system 66, the presence of fiducials 90 will not affect infrared gaze tracking images of the user's eyes gathered with camera 66C. The area consumed when removing portions of an infrared reflector to form non-reflective regions for fiducials 90 may also be relatively small (e.g., less than 1%) of the total area over which infrared light reflects between eye box 30 and camera 66C to help avoid any undesired optical impact of these removed portions, even when fiducials 90 are located in area 30R.

Figure 13:
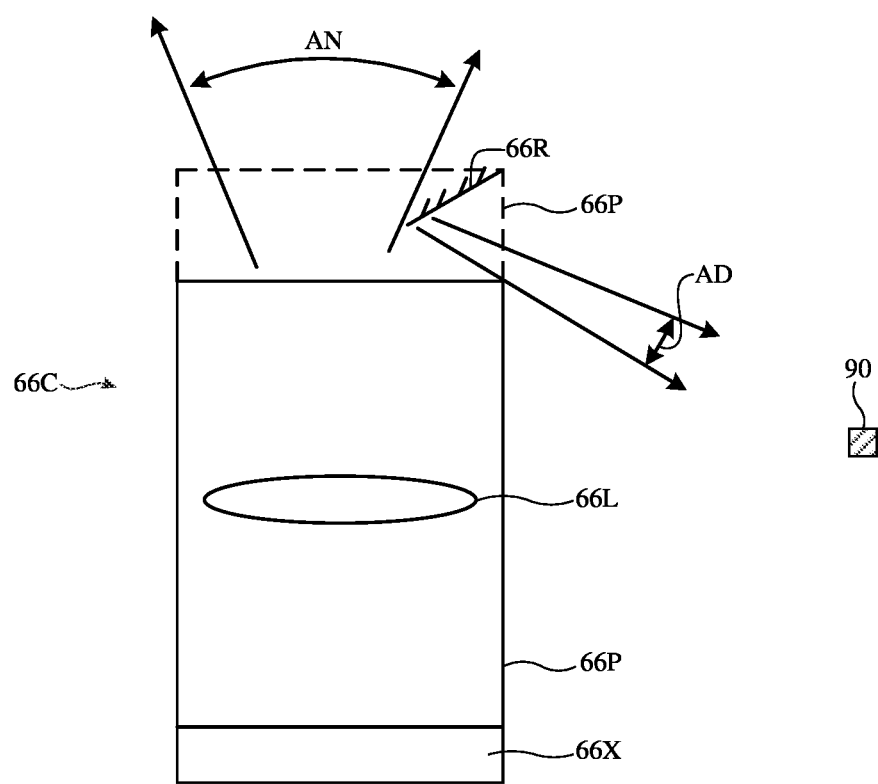
FIG. 13 is a cross-sectional side view of an illustrative gaze tracking camera in accordance with an embodiment.

If desired, gaze tracking systems 66 may be configured to monitor fiducials in areas that are not directly in front of cameras 66C. As shown in FIG. 13, Camera 66C may include an image sensor such as image sensor 66X (e.g., an infrared image sensor) and a lens such as lens 66L coupled to package 66P. Camera 66C may also be provided with an infrared reflector (e.g., an infrared mirror) such as reflector 66R that is supported by package 66P and that is oriented to redirect a portion of the field of view of camera 66C to the side and/or rear of camera 66C. This allows camera 66C to gather images such as an image of fiducial 90 of FIG. 13 from a location to the side of camera 66C and/or behind camera 66C (e.g., over angular range AD) in addition to gathering images from a location in front of camera 66C (e.g., over angular range AN). Fiducials 90 can be located off to the side of gaze tracking system with this type of arrangement (e.g., to monitor alignment of support structure 26-2 and/or associated structures).

Figure 14:
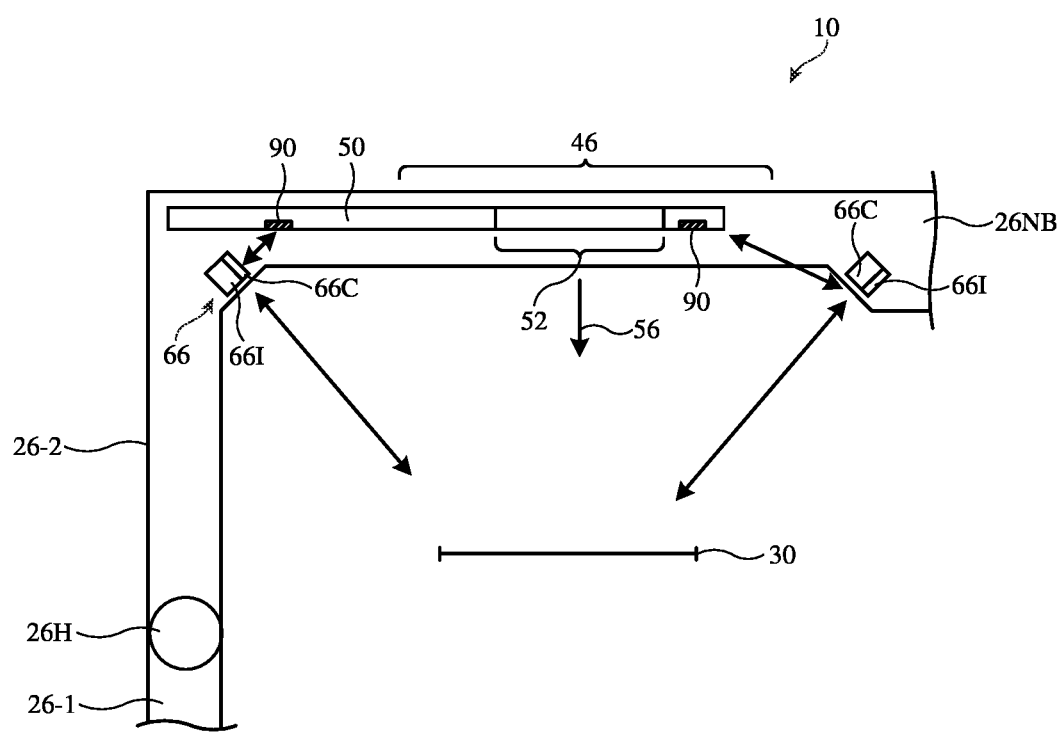
FIG. 14 is a top view of an illustrative head-mounted device with line-of-sight gaze trackers in accordance with an embodiment.

Consider, as an example, the illustrative side-imaging configuration of gaze tracking sensor 66 of FIG. 14. In this arrangement, one or more gaze tracking systems 66 have cameras 66C with side-viewing and/or rearward-viewing capabilities for capturing images of fiducials 90 on waveguide 50, on output coupler 52, and/or on other parts of lens 46 and the front portions of structure 26-2 while at the same time allowing the normal forward-facing portions of these cameras to face directly at eye box 30 for gaze tracking of the user's eye in eye box 30. Gaze tracking cameras such as these may be located in the outer corners of structure 26-2 or on nose bridge 26NB.

If desired, device 10 can be calibrated when enclosed within a carrying case (e.g., a battery case, a case without a battery, or other enclosure). Consider, as an example, the illustrative configuration of FIG. 15, in which device 10 has been placed in interior region 150 of case 152. The walls of case 152 may be formed from fabric, polymer, metal, glass, ceramic, and/or other materials. Case 152 may have a closure formed form a clasp, zipper, or other closure. When opened, device 10 may be placed in interior region 150 for storage and for receiving battery power from a battery in case 152 (as an example).

Figure 15:
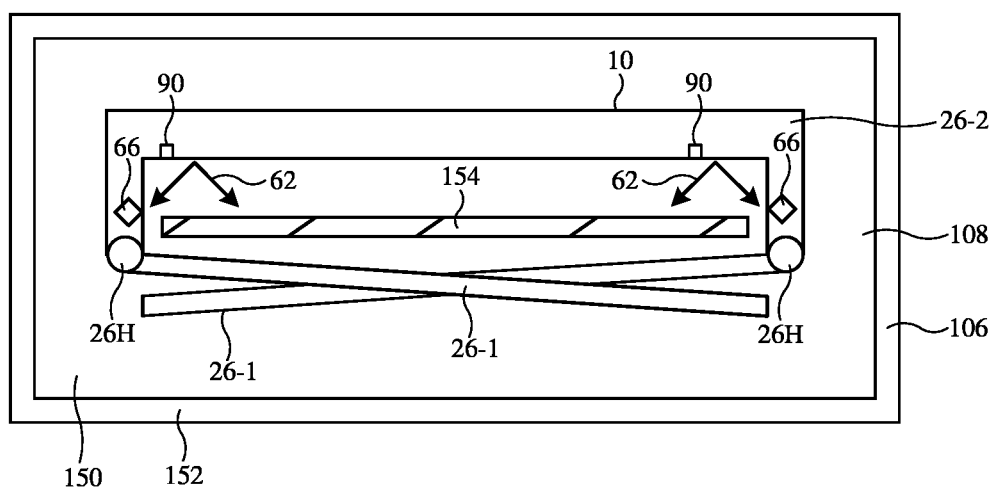
FIG. 15 is a top cross-sectional view of an illustrative head-mounted device and an associated case with structures to facilitate in-case calibration in accordance with an embodiment.

Before placing device 10 in interior 150, elongated side structures 26-1 (e.g., left and right temples coupled to structure 26-2 by hinges 26H) may be folded as shown in FIG. 15. This reduces the overall size of device 10. Case 152 may have a structure such as member 154 that serves as a neutral (e.g., non-patterned) backdrop to help gaze tracking systems 66 gather fiducial images. Member 154 may be formed from polymer and/or other materials and may be white, gray, black, or may have other appearances. While located in interior 150, gaze tracking systems 66 may emit infrared light. This light may illuminate fiducials 90 and may reflect from the infrared reflector on lens 46 or other portion of the front of structure 26-2 towards the surface of member 154 along path 62. At the same time, gaze tracking systems 66 may capture images of fiducials 90 to detect bending or other deformation of structure 26-2 so that appropriate action can be taken (e.g., to calibrate device 10 so that gaze tracking system s66 are aligned with cameras and displays in structure 26-2). Member 154 may serve as a featureless backdrop that does not create a detectable pattern that might interfere with the pattern of fiducials 90 present in the images captured with gaze tracking systems 66.

Device 10 may calibrate gaze tracking systems 66 by capturing images of fiducials 66 each time device 10 is placed in case 152, in accordance with a predetermined schedule, whenever a drop event is detected, in response to a manually input command, and/or in response to other suitable calibration criteria. Following calibration measurements, corresponding calibration data may be stored in the memory of device 10 so that gaze tracking systems 66 are calibrated during subsequent operation of device 10 by a user (e.g., when device 10 is being worn on a user's head).

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/ earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device, comprising:
   a head-mounted frame;
   left and right lenses in the head-mounted frame;
   left and right infrared-light reflectors that respectively overlap the left and right lenses;
   left and right gaze tracking cameras configured to gather respective left and right gaze tracking images from left and right eye boxes that reflect, respectively, from the left and right infrared-light reflectors; and
   fiducials formed from openings in the left and right infrared-light reflectors, wherein the left and right gaze tracking cameras are configured to capture images of the fiducials.

2. The head-mounted device defined in claim 1 wherein the left and right gaze tracking cameras are configured to monitor movement of the left and right infrared-light reflectors respectively using the captured images.

3. The head-mounted device defined in claim 2 further comprising left and right gaze tracking light sources, wherein the left gaze tracking light source is configured to produce left infrared light that illuminates the left eye box and wherein the right gaze tracking light source is configured to produce right infrared light that illuminates the right eye box.

4. The head-mounted device defined in claim 3 wherein the left infrared-light reflector is transparent, wherein the right infrared-light reflector is transparent, and wherein real-world images are viewable through the left infrared-light reflector from the left eye box and through the right infrared-light reflector from the right eye box.

5. The head-mounted device defined in claim 4 further comprising left and right temples and left and right hinges coupled respectively between the left and right temples and left and right portions of the head-mounted frame.

6. The head-mounted device defined in claim 4 further comprising a left vision-correction lens element aligned with the left lens and a right vision-correction lens element aligned with the right lens.

7. The head-mounted device defined in claim 6 wherein the fiducials comprise left fiducials on the left vision-correction lens element and right fiducials on the right vision-correction lens element.

8. The head-mounted device defined in claim 4 further comprising a left display configured to produce a left image for the left eye box and a right display configured to produce a right image for the right eye box.

9. The head-mounted device defined in claim 8 further comprising a left waveguide through which the left image passes to the left eye box and a right waveguide through which the right image passes to the right eye box.

10. The head-mounted device defined in claim 9 wherein the fiducials are on the left waveguide and the right waveguide.

11. The head-mounted device defined in claim 1 wherein the fiducials are on the head-mounted frame.

12. A head-mounted device, comprising:
   a head-mounted support structure;
   a display coupled to the head-mounted support structure and configured to produce an image;
   a waveguide coupled to the head-mounted support structure and configured to receive the image, wherein the waveguide has a first edge and an opposing second edge;
   an output coupler configured to direct the image from the waveguide towards an eye box;
   a gaze tracking system coupled to the head-mounted support structure; and
   an infrared reflector coupled to the waveguide, wherein the infrared reflector extends from the first edge to the second edge, the infrared reflector is configured to pass a real-world visible light image to the eye box and configured to reflect infrared light from the eye box to the gaze tracking system, portions of the infrared reflector are configured to form fiducials, and the gaze tracking system is configured to capture an image of the fiducials.

13. The head-mounted device defined in claim 12 wherein the infrared reflector comprises a stack of thin-film dielectric layers configured to reflect the infrared light with a first reflectivity, wherein the fiducials comprise areas that exhibit a second reflectivity that is less than the first reflectivity.

14. The head-mounted device defined in claim 12 wherein the infrared reflector comprises a diffraction grating and wherein the fiducials comprise areas without the diffraction grating.

15. The head-mounted device defined in claim 12 further comprising a transparent lens through which the real world visible light image passes.

16. The head-mounted device defined in claim 15 wherein the transparent lens is configured to support the infrared reflector and wherein the infrared reflector has an eye box reflection area configured to reflect an infrared image from the eye box to the gaze tracking system.

17. The head-mounted device defined in claim 16 wherein the fiducials are located outside of the eye box reflection area.

18. The head-mounted device defined in claim 12 wherein the gaze tracking system is calibrated for misalignment between the infrared reflector and the gaze tracking system using the image of the fiducials.

19. The head-mounted device defined in claim 12 wherein the head-mounted support structure has a frame configured to support a lens through which the real-world visible light image passes to the eye box and has temples coupled to the frame by hinges and wherein the gaze tracking system faces the frame.

20. A head-mounted device, comprising:
   a head-mounted support structure;
   a display system coupled to the head-mounted support structure and configured to produce an image that is directed from a waveguide through an output coupler towards an eye box, wherein the output coupler is transparent and is configured to allow real-world objects to be viewed through the output coupler from the eye box; and
   a gaze tracking system having a gaze tracking camera configured to directly capture an infrared gaze tracking image from the eye box without reflection while capturing an image of a fiducial.

21. The head-mounted device defined in claim 20 wherein the head-mounted device comprises a glasses frame and a pair of temples coupled to the glasses frame and wherein the fiducial is on the glasses frame.

22. The head-mounted device defined in claim 20 further comprising a lens, wherein the head-mounted support structure is configured to support the lens and wherein the fiducial overlaps the lens.

23. The head-mounted device defined in claim 20 wherein the fiducial overlaps the waveguide.

* * * * *